(12) United States Patent
Graves

(10) Patent No.: US 9,878,810 B2
(45) Date of Patent: Jan. 30, 2018

(54) SELF-CONTAINED STUD ADHESIVE BONDING APPARATUS AND METHOD OF USE

(71) Applicant: The Boeing Company, Chicago, IL (US)

(72) Inventor: Russell Graves, Friendswood, TX (US)

(73) Assignee: The Boeing Company, Chicago, IL (US)

(*) Notice: Subject to any disclaimer, the term of this patent is extended or adjusted under 35 U.S.C. 154(b) by 562 days.

(21) Appl. No.: 14/588,482

(22) Filed: Jan. 2, 2015

(65) Prior Publication Data

US 2016/0194097 A1    Jul. 7, 2016

(51) Int. Cl.
*B64G 4/00* (2006.01)
*F16B 47/00* (2006.01)
*F16B 37/04* (2006.01)

(52) U.S. Cl.
CPC .............. *B64G 4/00* (2013.01); *F16B 47/003* (2013.01); *F16B 37/048* (2013.01)

(58) Field of Classification Search
CPC ................................ F16B 47/003; B64G 4/00
USPC ........................ 411/258; 248/205.3; 156/391
See application file for complete search history.

(56) References Cited

U.S. PATENT DOCUMENTS

| | | | | |
|---|---|---|---|---|
| 3,472,301 A | * | 10/1969 | Pearce, Jr. ............. | F16B 33/004 264/261 |
| 4,098,166 A | * | 7/1978 | Lang ...................... | F16B 13/143 411/23 |
| 4,390,576 A | * | 6/1983 | Hutter, III ........... | B29C 65/7855 156/247 |
| 4,830,558 A | * | 5/1989 | Sweeney ............... | F16B 13/143 248/205.3 |

OTHER PUBLICATIONS www.clickbond.com—Home page from website.

* cited by examiner

*Primary Examiner* — Scott W Dodds
(74) *Attorney, Agent, or Firm* — Joseph M. Rolnicki; Evans & Dixon, L.L.C.

(57) ABSTRACT

A self-contained stud adhesive bonding apparatus enables an externally threaded stud to be adhesively attached to a separate surface in an adverse environment for an adhesive, such as the vacuum of space.

20 Claims, 13 Drawing Sheets ment of the adhesive cartridge, causing the cartridge to eject the adhesive through the mixer and into the adhesive well of the mount assembly base. The mixer mixes components of the adhesive as the adhesive is ejected from the cartridge through the mixer and into the adhesive well.

SELF-CONTAINED STUD ADHESIVE BONDING APPARATUS AND METHOD OF USE

The invention described herein was made in the performance of work under NASA Contract No. NAS15/10000 and is subject to the provisions of Section 305 of the National Aeronautics and Space Act of 1958 (72 Stat. 435:42 USC 2457.)

FIELD

This disclosure pertains to a self-contained stud adhesive bonding apparatus. More specifically, this disclosure pertains to an externally threaded stud having a self-contained, internally disposed epoxy system that enables the stud to be attached to a separate surface in an adverse environment such as the vacuum of space.

BACKGROUND

There is an existing risk to space vehicles of the inability to perform external structural repairs on the space vehicle in space. Structural doublers or pressure wall repairs on the external surfaces of the space vehicle require fixturing to install. A typical fixturing method would involve the use of externally threaded studs. However, drilling holes in the exterior surfaces of the space vehicle pressure walls for installing studs is not an acceptable solution. Stud welders have not been adapted for space use or proven for space vehicle alloy use. Conventional epoxy bonded studs that employ an epoxy that is mixed separately and manually applied to the stud adhesive base prior to the stud base being adhered to a separate surface would not work for studs adhered to an exterior surface of a space vehicle in space. A crew member suited for a space walk would be unable to safely and easily dispense and apply the epoxy, then install the stud with the epoxy applied. Further, the vacuum of space destroys the utility of liquid-based adhesives. The vacuum pulls off all moisture and gasses from the liquids, generating large bubbles and rendering the liquids, including epoxy resins, unusable for their intended purposes in the vacuum of space.

SUMMARY

The self-contained stud adhesive bonding apparatus of this disclosure enables an externally threaded stud to be adhered to an exterior surfaces of a space vehicle in the vacuum of space. The apparatus is basically comprised of a mount assembly, a stud assembly and an adhesive cartridge.

The mount assembly has a circular base with a center axis that defines mutually perpendicular axial and radial directions relative to the mount assembly. The base has a circular first base surface, a circular second base surface on an axially opposite side of the base from the first base surface, and a base side surface that extends axially between the first base surface and the second base surface. The base also has a cylindrical adhesive well recessed into the first base surface. The adhesive well has a circular well surface that is coaxial with and positioned coaxially between the first base surface and the second base surface. The adhesive well also has a cylindrical well surface that is coaxial with and extends axially between the circular well surface and the first base surface. A circular seal on the first base surface surrounds the adhesive well.

The mount assembly further includes a cylindrical shaft projecting from the second base surface. The shaft has external screw threading and is coaxial with the base center axis. The shaft extends axially from the second base surface to a circular shaft end surface at an axially opposite end of the shaft from the second base surface.

The mount assembly still further includes a shaft bore through the center of the shaft. The shaft bore has a cylindrical interior surface that is coaxial with the base center axis. The shaft bore extends from a circular well opening in the adhesive well circular well surface, axially through the base and through the shaft to a circular shaft end opening in the shaft end surface.

The stud assembly has a bolt head, for example a hex bolt head, a square bolt head, etc. The bolt head has a first bolt head surface, a second bolt head surface on an opposite side of the bolt head from the first bolt head surface, and a bolt head side surface that extends between the first bolt head surface and the second bolt head surface.

The stud assembly also includes a cylindrical stud that projects from the second bolt head surface. The stud has a center axis that defines mutually perpendicular axial and radial directions relative to the stud assembly. The stud has external screw threading that extends axially from the second bolt head surface along the stud to a circular stud end surface at an axially opposite end of the stud from the second bolt head surface.

The stud assembly further includes a stud bore in the center of the stud. The stud bore has an interior surface with internal screw threading that is dimensioned to fit over the external screw threading of the mount assembly shaft. The stud bore extends from a circular bolt head opening in the first bolt head surface, axially through the bolt head and into the stud to a circular stud bore end surface in the stud.

The stud assembly still further includes a plunger in the stud bore. The plunger is coaxial with the stud center axis and extends axially through the stud bore from the stud bore end surface to a distal end surface of the plunger that is positioned in the stud bore axially between the first bolt head surface and the second bolt head surface.

The adhesive cartridge has a cylindrical housing containing an adhesive and a mixer. The mixer mixes components of the adhesive as they are ejected from the cartridge through the mixer. In use of the apparatus, the adhesive cartridge is positioned in the mount assembly shaft bore with the mixer adjacent the well opening of the shaft bore.

The stud assembly is removably attached to the mount assembly by screw threading the internal screw threading of the stud bore over the external screw threading of the mount assembly shaft. Prior to use, the stud assembly screw threads are removably engaged with the mount assembly screw threads only to the extent that the stud assembly plunger is positioned adjacent the adhesive cartridge in the mount assembly shaft bore, thereby making the apparatus a single assembly for the purpose of installation.

In use of the apparatus in adhesive bonding a stud to a separate surface, the mount assembly containing the adhesive cartridge and removably attached to the stud assembly with the seal is first positioned against the separate surface with the mount assembly first base surface and adhesive well opposing the separate surface. The seal holds the apparatus to the separate surface.

The stud assembly is then rotated relative to the mount assembly to screw the stud assembly onto the mount assembly. The relative rotation between the stud assembly and the mount assembly causes the stud assembly stud bore to move over the mount assembly shaft and the stud assembly bolt head to move toward the mount assembly base. This in turn causes the stud assembly plunger to move through the shaft interior bore, engage with the adhesive cartridge and push the adhesive from the cartridge through the mixer and into the adhesive well. The adhesive pushed into the adhesive well secures the mount assembly and the attached stud assembly to the separate surface. The adhesive in the well is sealed from the exterior environment of the apparatus, for example the vacuum of space. In this manner the apparatus and its method of use adheres an externally thread stud to a separate surface in an environment that is adverse to the adhesive.

The features, functions and advantages that have been discussed can be achieved independently in various embodiments or may be combined in yet other embodiments further details of which can be seen with reference to the following description and drawings.

DESCRIPTION

Figure 1:
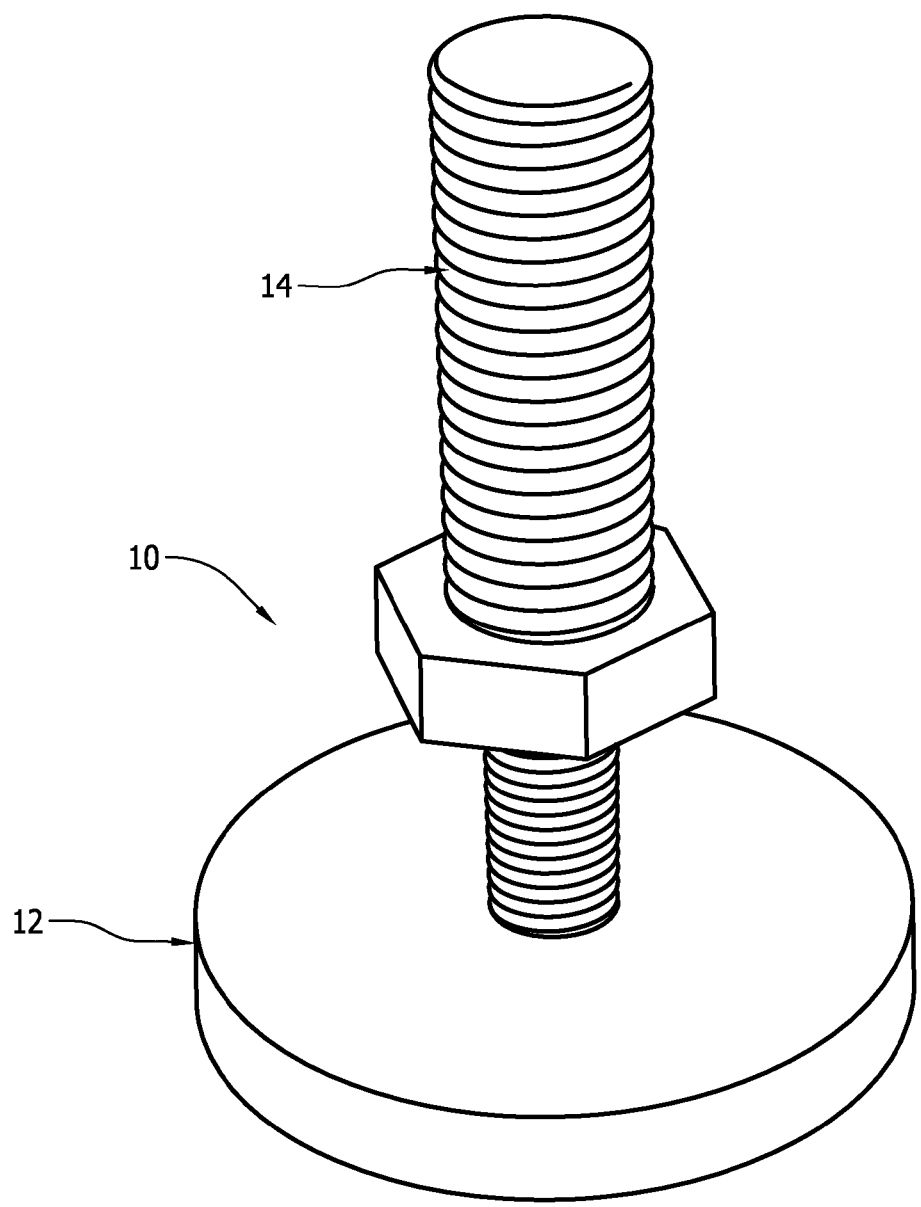
FIG. 1 is a representation of a perspective view of the self-contained stud adhesive bonding apparatus of this disclosure.

FIG. 1 is a representation of a perspective view of the self-contained stud adhesive bonding apparatus 10 of this disclosure. The apparatus 10 is basically comprised of a mount assembly 12, a stud assembly 14 and an adhesive cartridge 16, all of which are shown in their relative positions in the side sectioned view of the apparatus represented in FIG. 2. The mount assembly 12 and stud assembly 14 are constructed of metal to give the apparatus sufficient strength for its intended function. Other equivalent materials could be used for different load applications. The adhesive cartridge 16 is constructed of materials typically used in the construction of other similar adhesive cartridges.

Figure 3:
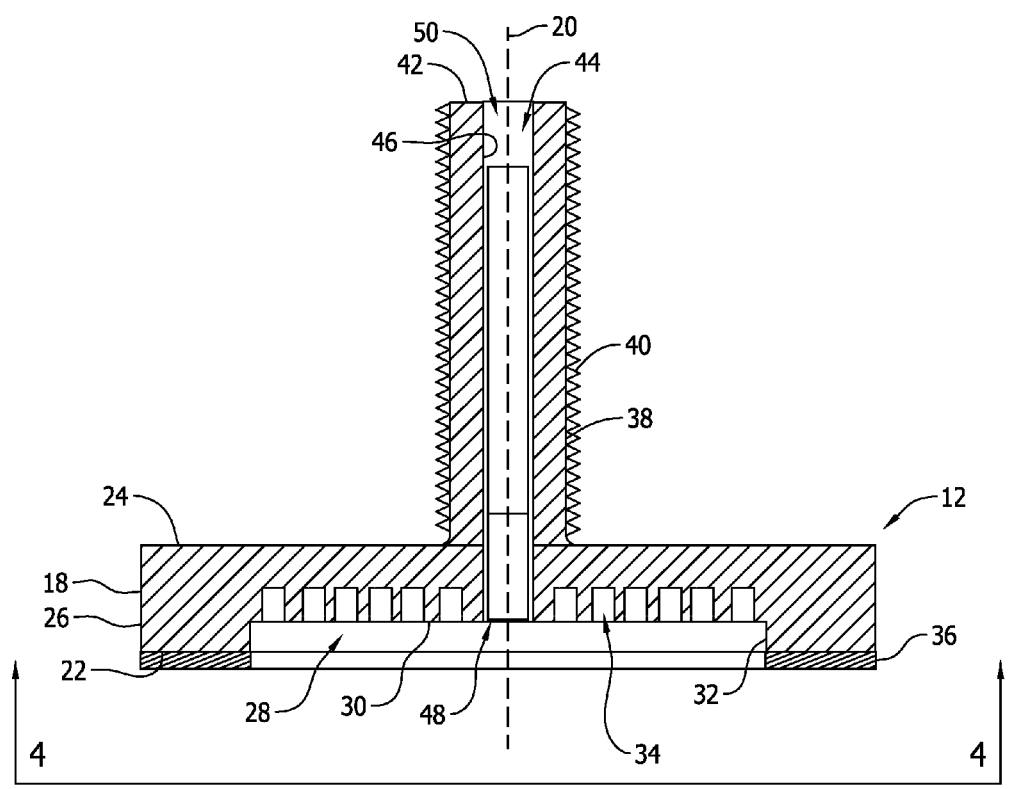
FIG. 3 is a representation of a side sectioned view of the mount assembly apparatus removed from the stud assembly of the apparatus.
Figure 4:
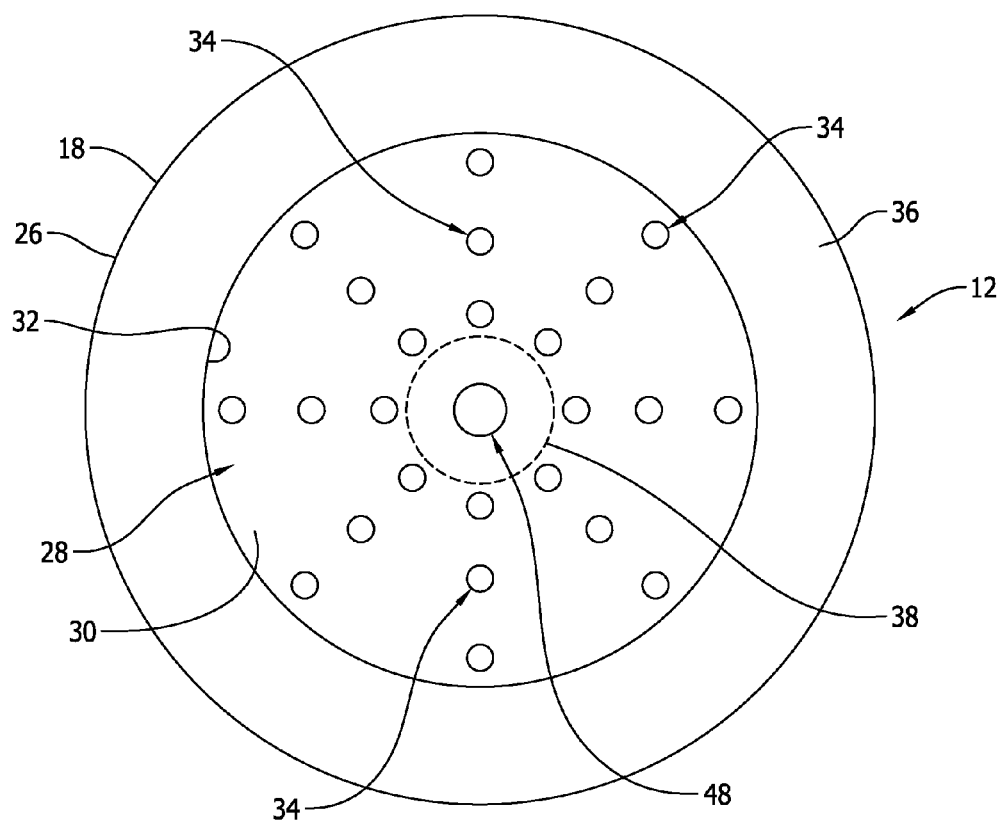
FIG. 4 is a representation of a view of the mount assembly from along the line 4-4 in FIG. 3.

Referring to FIGS. 3 and 4, the mount assembly 12 has a circular base 18 with a center axis 20 that defines mutually perpendicular axial and radial directions relative to the mount assembly 12. The base 18 has a circular first base surface 22, a circular second base surface 24 on an axially opposite side of the base 18 from the first base surface 22, and a base side surface 26 that extends axially between the first base surface 22 and the second base surface 24. The base 18 also has a cylindrical adhesive well 28 recessed into the first base surface 22. The adhesive well 28 has a circular well surface 30 that is coaxial with and positioned axially between the first base surface 22 and the second base surface 24. The adhesive well 28 also has a cylindrical well surface 32 that surrounds the adhesive well 28 and is coaxial with and extends axially between the first base surface 22 and the circular well surface 30. A plurality of torque reaction adhesive pockets 34 are further recessed into the base 18 from the adhesive well circular well surface 30. These adhesive pockets 34 are optional. If the sheer strength of the adhesive adhering to the circular well surface 30 and cylindrical well surface 32 is greater than the sheer strength of the adhesive, the presence of the torque reaction adhesive pockets 34 would reduce the capability of the apparatus and could be eliminated. Depending on the application of the apparatus 10 and the adhesive selected to be used with the apparatus, the adhesive pockets 34 could be an optional feature.

An adhesive ring seal or gasket 36 is secured to the base first surface 22. As seen in FIG. 4, the adhesive seal 36 extends completely around the adhesive well 28. In use of the apparatus, the seal 36 seals the interior volume of the adhesive well 28 from the exterior environment of the apparatus 10.

The mount assembly 12 further includes a cylindrical shaft 38 projecting axially from the second base surface 24. The shaft 38 has external screw threading 40 that is coaxial with the base center axis 20. The shaft 38 extends from the second base surface 24 to a circular shaft end surface 42 on an opposite end of the shaft 38 from the second base surface 24.

The mount assembly 12 still further includes a shaft bore 44 through the center of the shaft 38. The shaft bore 44 has a cylindrical interior surface 46 that is coaxial with the base center axis 20. The shaft bore 44 extends from a circular well surface opening 48 in the adhesive well circular well surface 30, axially through the base 18 and through the shaft 38 to a circular shaft end opening 50 in the shaft end surface 42.

Figure 5:
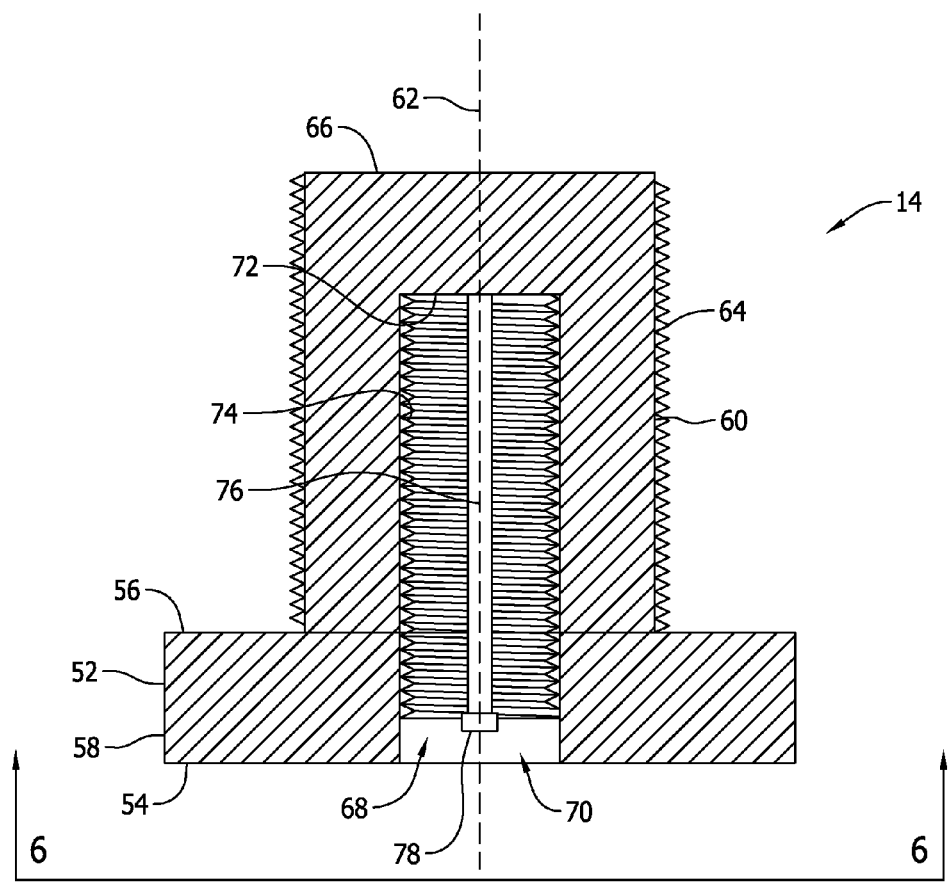
FIG. 5 is a representation of a side sectioned view of the stud assembly of the apparatus removed from the mount assembly.
Figure 6:
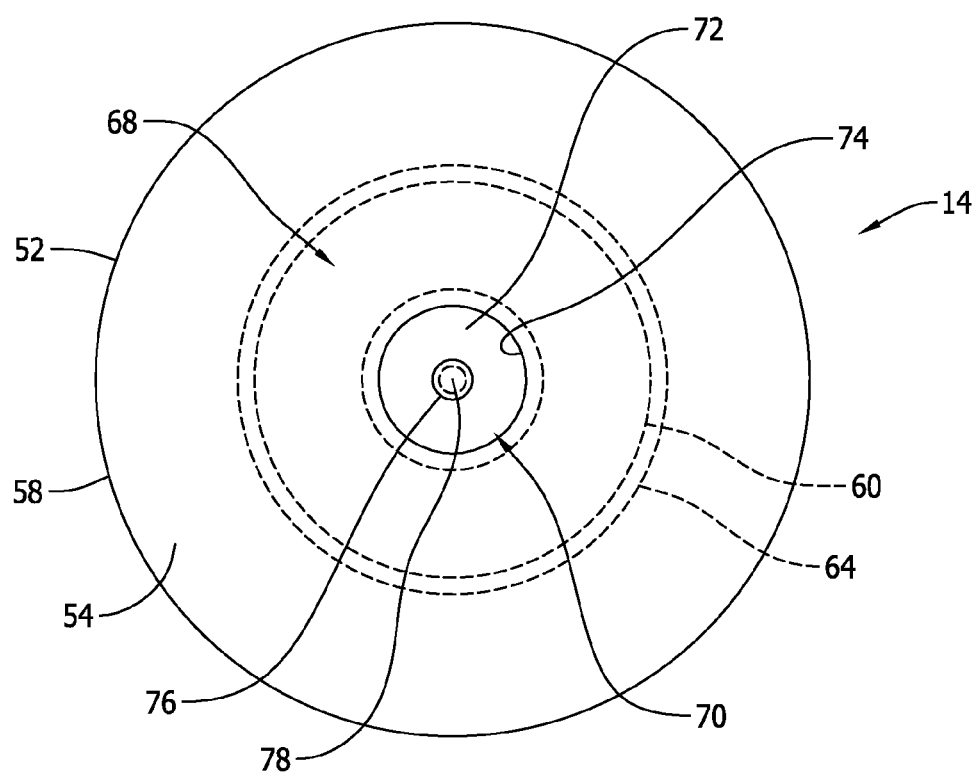
FIG. 6 is a representation of a view of the stud assembly from along the line 6-6 in FIG. 5.

Referring now to FIGS. 5 and 6, the stud assembly 14 has a bolt head 52 at one end of the stud assembly 14. The bolt head 52 could be configured as a circular, hex bolt head, a square bolt head, or some other equivalent configuration of bolt head. The bolt head 52 has a first bolt head surface 54, a second bolt head surface 56 on an opposite side of the bolt head from the first bolt head surface 54, and a bolt head side surface 58 that extends between the first bolt head surface 54 and the second bolt head surface 56.

The stud assembly 14 also includes a cylindrical stud 60 that projects from the second bolt head surface 56. The stud 60 has a center axis 62 that defines mutually perpendicular axial and radial directions relative to the stud assembly 14. The stud 60 has external screw threading 64 that extends axially from the second bolt head surface 56 along the stud 60 to a circular stud end surface 66 at an axially opposite end of the stud 60 from the second bolt head surface 56.

The stud assembly 14 further includes a stud bore 68 in the center of the stud 60. The stud bore 68 extends from a circular bolt head opening 70 in the first bolt head surface 54, axially through the bolt head 52 and the stud 60 to a circular stud bore end surface 72. As seen in FIG. 5, the stud bore end surface 72 is positioned axially between the second bolt head surface 56 and the stud end surface 66. The stud bore 68 has an interior surface with internal screw threading 74 that is coaxial with the stud center axis 62. The internal screw threading 74 of the stud bore 68 is dimensioned to mesh and fit with the external screw threading 40 of the mount assembly shaft 38.

The stud assembly 14 still further includes a plunger 76 in the stud bore 68. The plunger 76 is coaxial with the stud center axis 62 and extends axially through the stud bore 68 from the stud bore end surface 72 to a distal end surface 78 of the plunger. The plunger distal end surface 78 is positioned in the stud bore 68 axially between the first bolt head surface 54 and the second bolt head surface 56.

Figure 2:
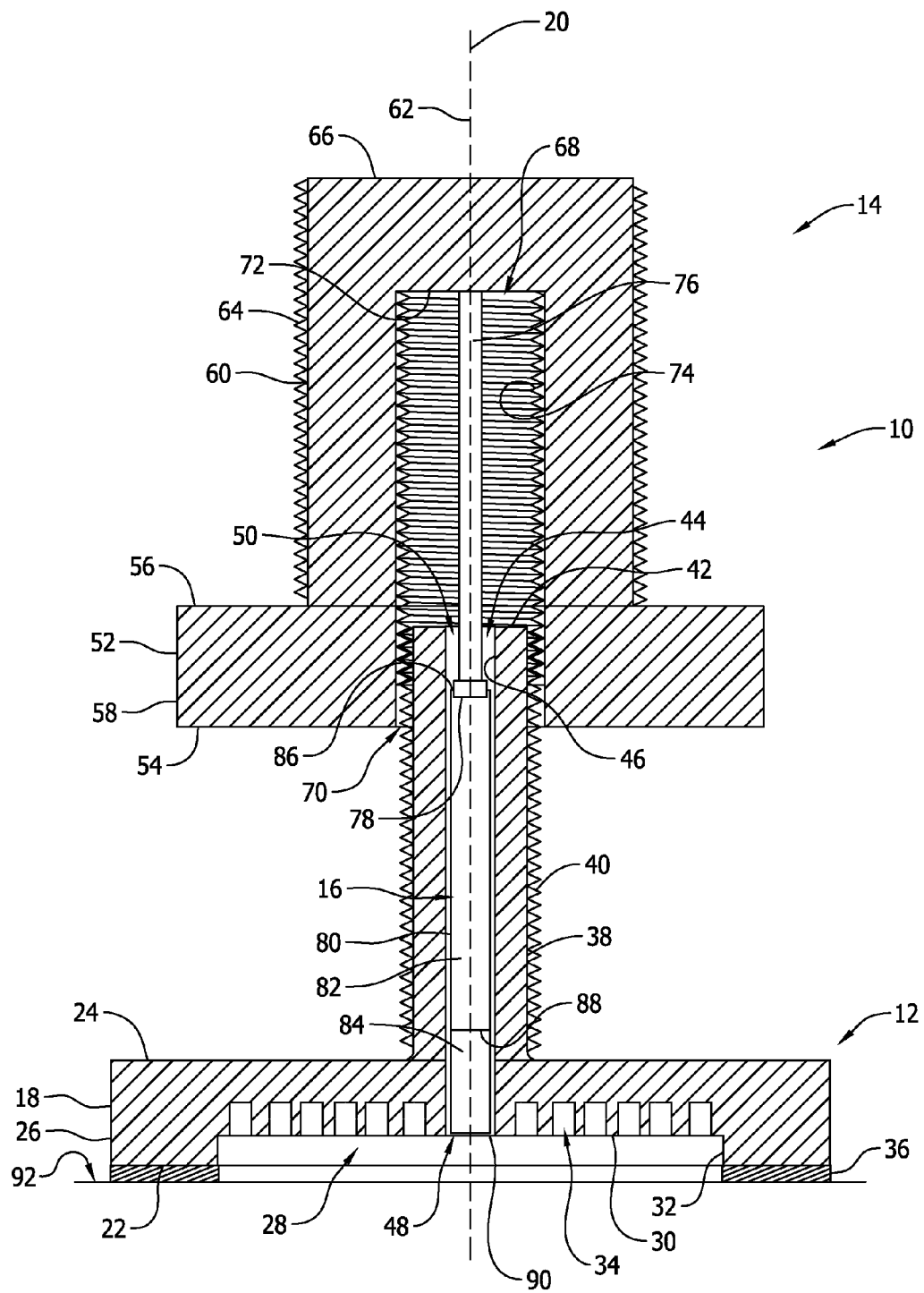
FIG. 2 is a representation of a side sectioned view of the apparatus.

The adhesive cartridge 16 can be constructed in the same manner as any known adhesive cartridge. The adhesive cartridge 16 has a cylindrical housing 80 containing an adhesive 82 and a mixer 84. Burst seals 88 and 86 as required by specific application, at opposite ends of the cartridge housing 80 seal the adhesive 82 inside the cartridge housing 80. In the example of the adhesive cartridge 16 shown in the drawings, the mixer 84 mixes the components of the adhesive 82 that are pushed through the mixer 84. In the apparatus as represented in FIG. 2, the adhesive cartridge 16 is positioned in the mount assembly shaft bore 44 with the mixer 84 adjacent the circular well surface opening 48 of the shaft bore 44. One or more protrusions or an annular lip 90 extend a short distance radially from the shaft bore interior surface 46 into the circular well surface opening 48. The mixer 84 of the adhesive cartridge 16 rests on these protrusions 90 and the protrusions 90 prevent the mixer 84 from moving through the circular well surface opening 48 and into the adhesive well 28 in use of the apparatus.

FIG. 2 is a representation of the apparatus 10 ready for use. As represented in FIG. 2, the adhesive cartridge 16 is positioned in the mount assembly shaft bore 44. The stud assembly 14 is removably attached to the mount assembly 12 by the internal screw threading 74 of the stud assembly stud 60 being screw threaded over the external screw threading 40 of the mount assembly shaft 38. The stud assembly 14 is removably attached to the mount assembly 12 only to the extent that the plunger distal end surface 78 in the stud bore 68 is positioned adjacent the adhesive cartridge 16 in the mount assembly shaft bore 44. In an initial step of using the apparatus 10, the apparatus is positioned adjacent a separate surface 92 to which the stud 60 is to be attached. The adhesive seal 36 is compressed against separate surface 92 to hold the apparatus 10 to the separate surface 92 and seal the interior of the adhesive well 28 from the exterior environment of the apparatus 10 and the separate surface 92.

Figure 7:
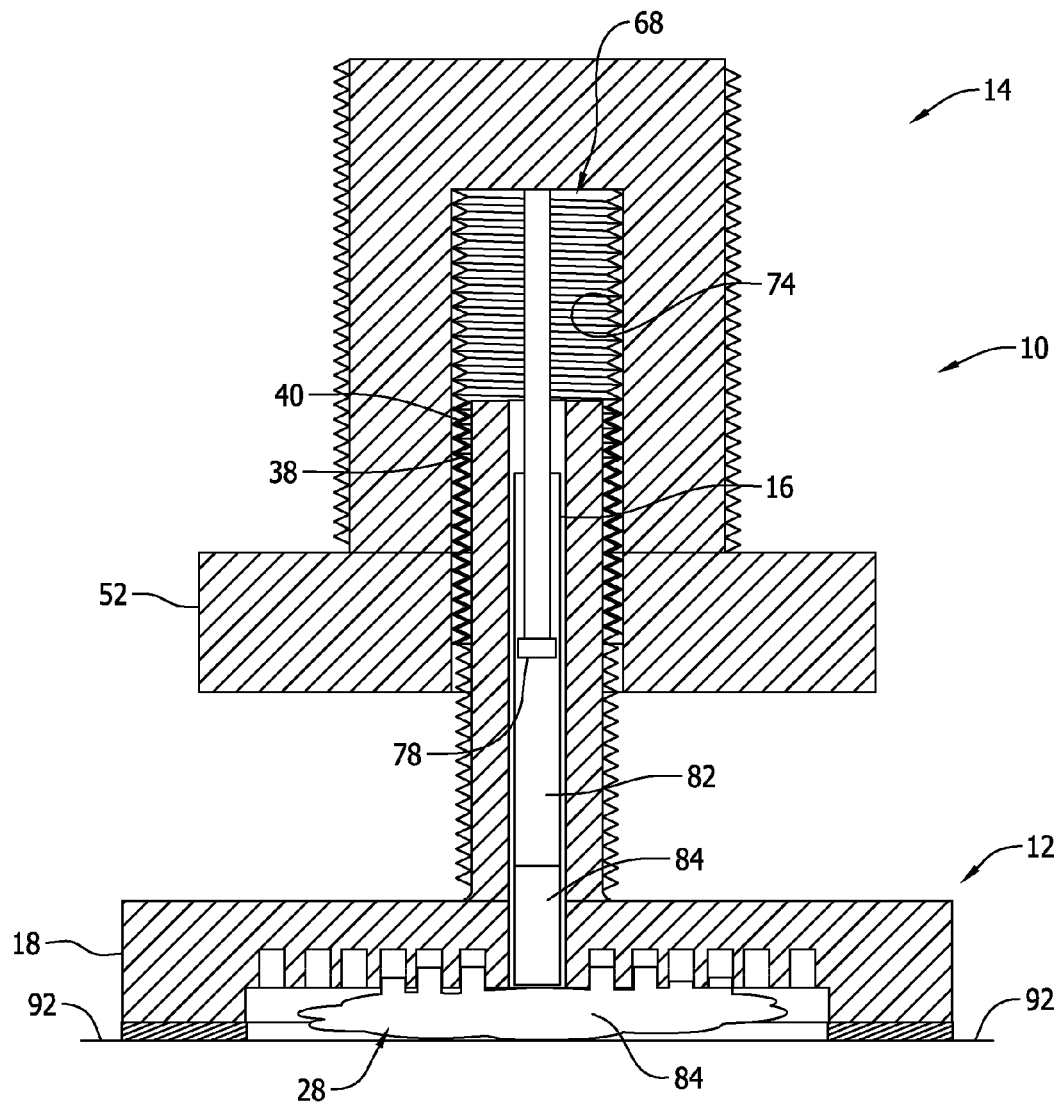
FIG. 7 is a representation of a side sectioned view of the apparatus showing the method of use in the apparatus.

Referring to FIG. 7, the stud assembly 14 is then turned on the mount assembly 12 causing the internal screw threading 74 of the stud bore 68 to screw over the external screw threading 40 on the mount assembly shaft 38. This causes the stud assembly 14 to move over the mount assembly 12 and the stud assembly bolt head 52 to move toward the mount assembly base 18. As the stud assembly 14 moves over the mount assembly 12, the stud assembly plunger distal end surface 78 moves through the end of the adhesive cartridge 16 and into the interior of the adhesive cartridge 16 as represented in FIG. 7. This movement of the plunger end surface 78 through the adhesive cartridge 16 forces the adhesive 82 to move through the burst seal 88 and move from the adhesive cartridge 16, through the mixer 84 and into the adhesive well 28. The rotation of the stud assembly 14 on the mount assembly 12 can be done manually, or with the assistance of a wrench on the bolt head 52.

Figure 8:
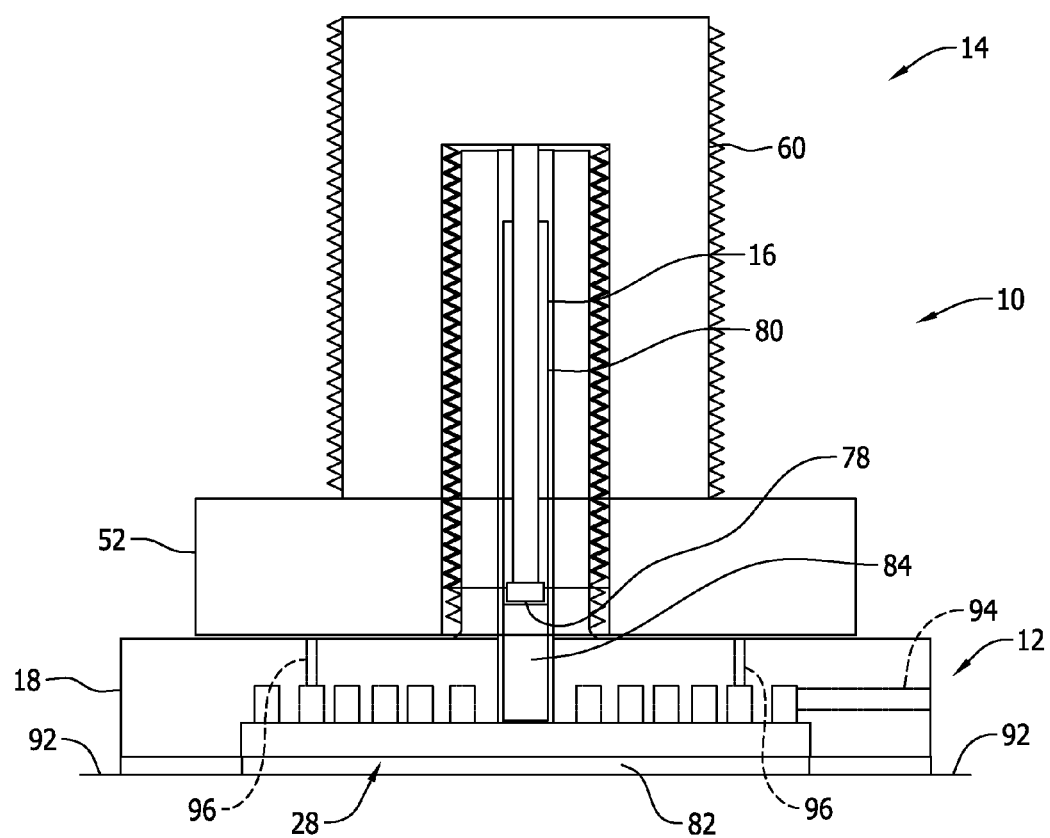
FIG. 8 is a representation of a side sectioned view of the apparatus showing the method of using the apparatus.

Referring to FIG. 8, continued rotation of the stud assembly 14 on the mount assembly 12 results in the plunger distal end surface 78 pushing the adhesive 82 from the adhesive cartridge housing 80, through the mixer 84 and into the adhesive well 28. When the apparatus 10 is used in a vacuum environment, for example in space, the volume of the adhesive well 28 contains and controls the expansion of gases that would destroy the epoxy. For terrestrial applications, a vent port 94 and/or vent ports 96 represented by dashed lines in FIG. 8 would be added to the mount assembly base 18 to reduce air pressure in the adhesive well 28 and to allow trapped air to escape from the adhesive well 28 as the epoxy 82 is injected. The adhesive 82 pushed into the adhesive well 28 secures the mount assembly 12 and the attached stud assembly 14 to the separate surface 92. The adhesive 82 in the adhesive well 28 is sealed from the exterior environment of the apparatus 10, for example the vacuum of space. In this manner, the apparatus 10 and its method of use adhere an externally threaded stud 60 to a separate surface 92 in an environment that is adverse to the adhesive 82. The epoxy provides a high strength structural bond as compared to the adhesive seal 36.

It should be understood that although the apparatus 10 is described herein as adhering a stud 60 to a separate surface 92 in the vacuum of space, the apparatus 10 is equally well suited for use in substantially any other environment with adaptation.

Figure 9:
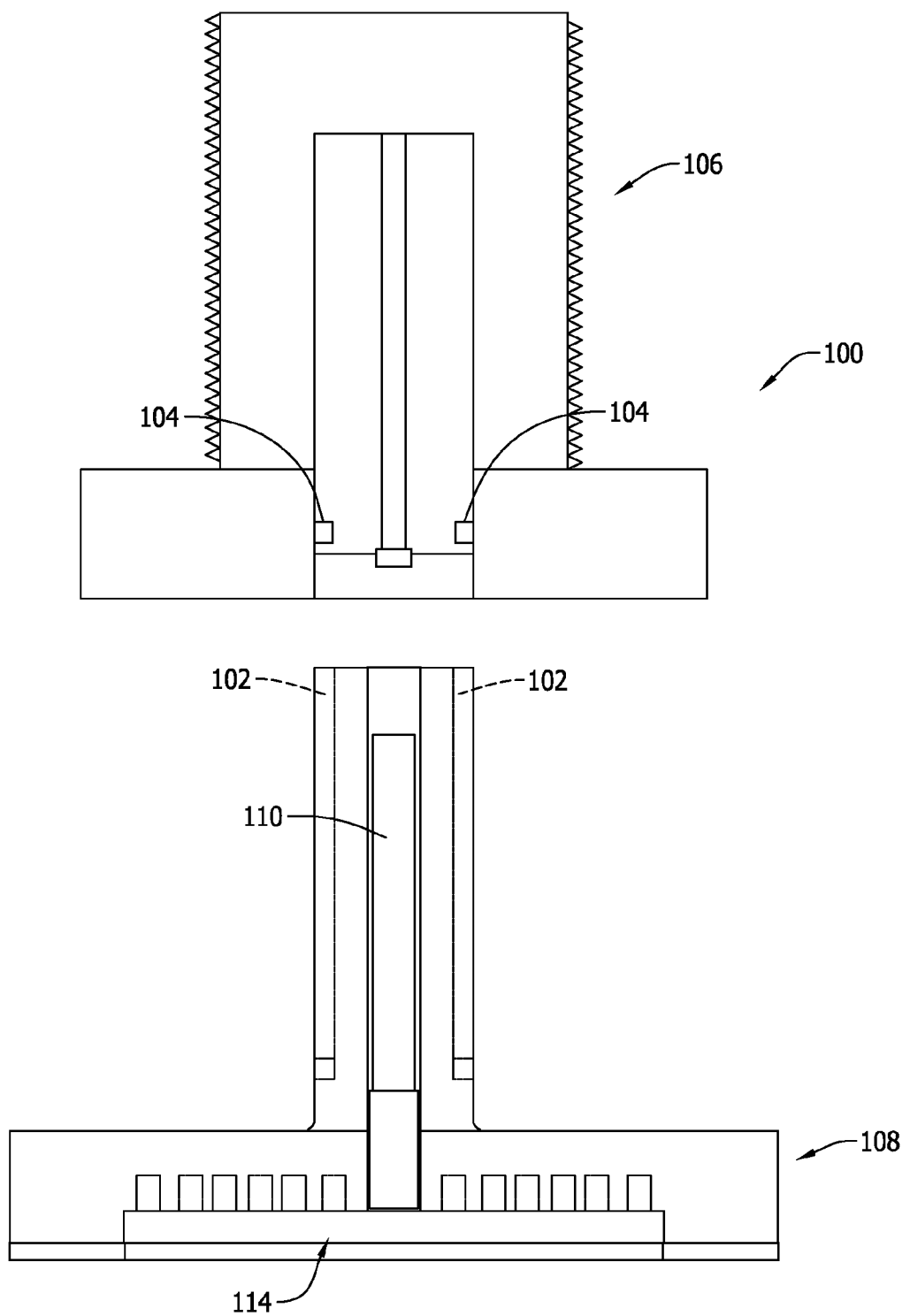
FIG. 9 is a representation of a side sectioned view of a variant embodiment of the apparatus.

FIG. 9 is a representation of a further embodiment of the apparatus 100 in which the external screw threading 40 of the mount assembly shaft 38 and the internal screw threading 74 of the stud assembly stud bore 68 have been replaced with guide lock pin grooves 102 and guide lock pins 104 of a push-twist-lock design. The other features of the apparatus of the FIG. 9 embodiment are the same as those of the FIG. 2 embodiment described earlier. In the FIG. 9 embodiment, the stud assembly 106 is pushed onto the mount assembly 108 to push the adhesive 110 in to the adhesive well 114, and the stud assembly 106 is then turned on the mount assembly 108 to lock the stud assembly 106 to the mount assembly 108.

Figure 10:
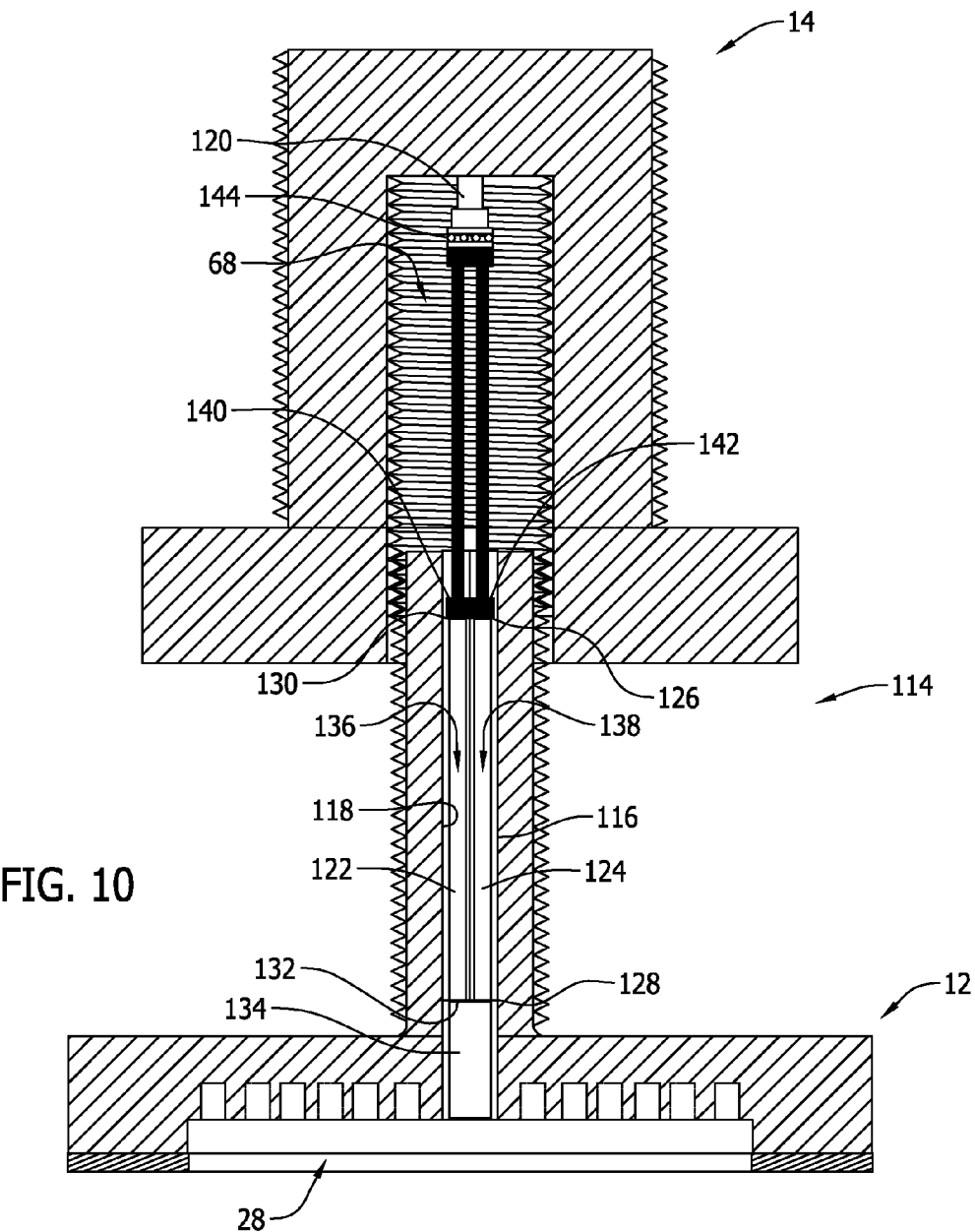
FIG. 10 is a representation of a side sectioned view of a variant embodiment of the apparatus.
Figure 11:
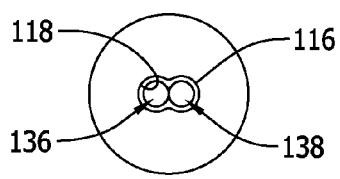
FIG. 11 is a representation of a cross-section through the mount assembly shaft of the apparatus shown in FIG. 10.

FIGS. 10 and 11 are representations of a further embodiment of the apparatus 114. In the apparatus 114 of FIGS. 10 and 11, the adhesive cartridge 116 has a different construction from that of the earlier described adhesive cartridge 16. Additionally, the mount assembly shaft interior bore 118 has a modified construction to accommodate the adhesive cartridge 116, and the stud assembly plunger 120 has a modified construction to accommodate the adhesive cartridge 116. The remaining features of the apparatus 114 are the same as those of the first described apparatus 10 and are labeled with the same reference numbers.

The adhesive cartridge 116 is designed to hold an adhesive that mixes first 122 and second 124 components, for example an epoxy with first and second epoxy components. The cartridge 116 has a length with opposite first 126 and second 128 ends. Burst seals 132 and 130 as required by specific application, at the opposite ends of the cartridge 116 seal the adhesive components 122, 124 in the cartridge 116. The burst seal 132 separates the interior of the cartridge 116 from an adhesive mixer 134. The cartridge includes first 136 and second 138 cylindrical conduits that extend, side by side, along the cartridge length. The first 136 and second 138 cylindrical conduits have circular cross-section configurations and give the cartridge 116 a general figure eight cross-section configuration as represented in FIG. 11. The first 136 and second 138 cylindrical conduits contain the respective first 122 and second 124 components of the adhesive. A pair of pistons 140, 142 are connected to the opposite end of the cartridge 116 from the mixer 134. The pistons 140, 142 have circular cross-section configurations that are complementary to the cross-section configurations of the respective first 136 and second 138 conduits and are positioned in the conduits. The pistons 140, 142 extend from the cartridge 116 through the stud assembly stud bore 68 to the plunger 120 in the stud bore 68. As represented in FIG. 10, the plunger 120 is much shorter than the plunger 76 of the first described embodiment to accommodate the lengths of the pistons 140, 142. The plunger 120 includes a thrust bearing 144 positioned between the plunger 120 and the pistons 140, 142. The thrust bearing 144 avoids the introduction of torque to the pistons 140, 142 from relative rotation of the mount assembly 12 and stud assembly 14.

The apparatus 114 of FIGS. 10 and 11 is operated according to the same method of the first described embodiment to dispense the adhesive components 122, 124 through their respective conduits 136, 138, through the mixer 134 and into the adhesive well 28 of the mount assembly 12.

Figure 12:
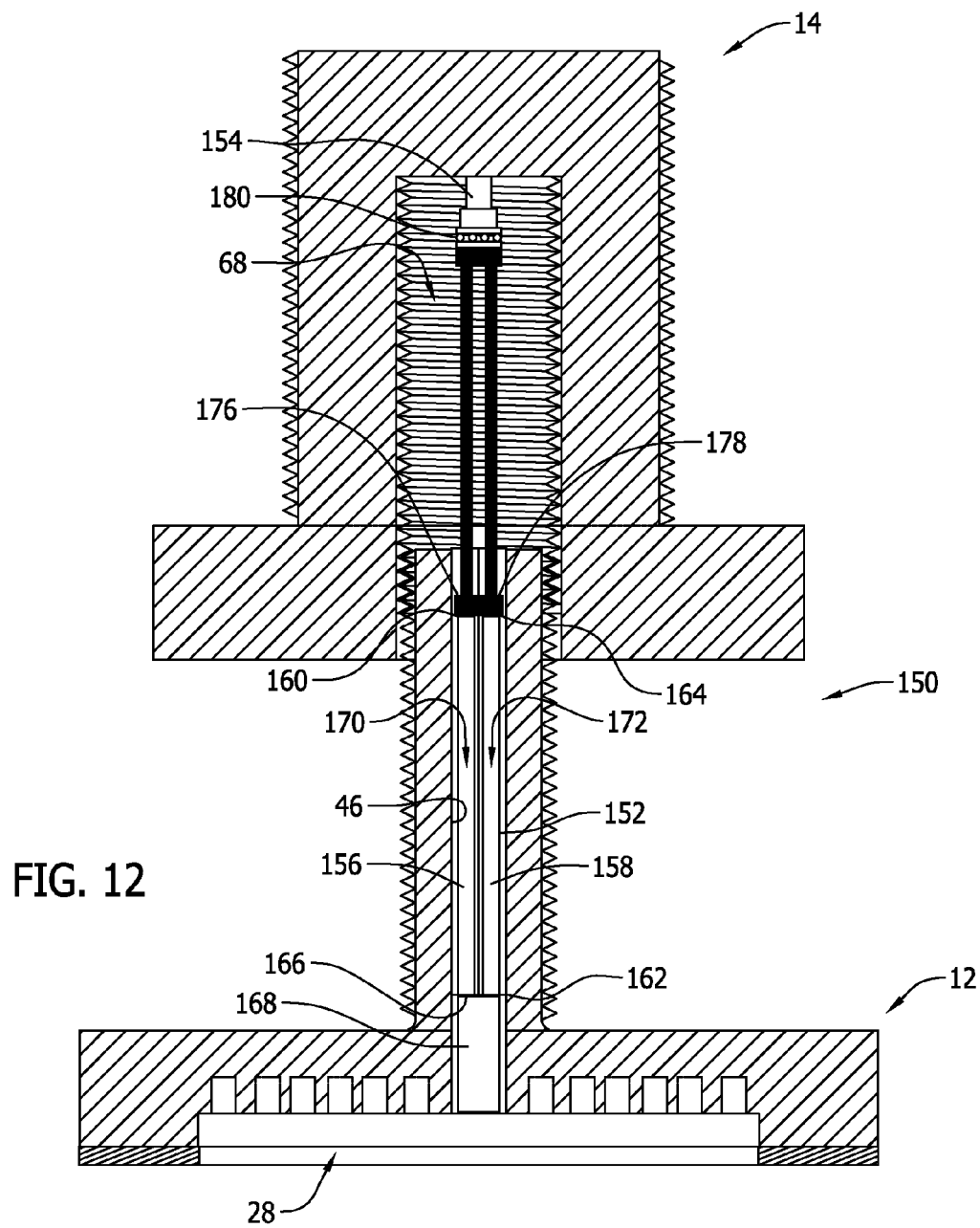
FIG. 12 is a representation of a side sectioned view of a further embodiment of the apparatus.
Figure 13:
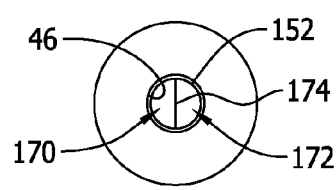
FIG. 13 is a representation of a cross-section view of the mount assembly shaft of the apparatus shown in FIG. 12.

FIGS. 12 and 13 are representations of a further embodiment of the apparatus 150. In the apparatus 150 of FIGS. 12 and 13, the adhesive cartridge 152 has a different construction from that of the first described adhesive cartridge 16, but only slightly different than that of the adhesive cartridge 116 of FIGS. 10 and 11. Additionally, the stud assembly plunger 154 has a modified construction to accommodate the adhesive cartridge 152. The remaining features of the apparatus 150 are the same as those of the first described apparatus 10 and are labeled with the same reference numbers.

The adhesive cartridge 152 is designed to hold an adhesive that mixes first 156 and second 158 components, for example an epoxy with first and second epoxy components. The cartridge 152 has a length with opposite first 160 and second 162 ends. Burst seals 166 and 164 as required by specific application, at the opposite ends of the cartridge seal the adhesive components 156, 158 in the cartridge 152. The burst seal 166 separates the interior of the cartridge 152 from an adhesive mixer 168. The cartridge 152 includes first 170 and second 172 conduits that extend, side by side, along the cartridge length. The conduits 170, 172 have half circular cross-section configurations as represented in FIG. 13 and are separated by an internal wall 174 that extends across the interior of the adhesive cartridge 152 and extends along the length of the adhesive cartridge. The first 170 and second 172 conduits contain the respective first 156 and second 158 components of the adhesive. A pair of pistons 176, 178 are connected to the opposite end of the cartridge 152 from the mixer 168. The pistons 176, 178 have half circle cross-section configurations that are complementary to the cross-section configurations of the respective first 170 and second 172 conduits and are positioned in the conduits. The pistons 176, 178 extend from the cartridge 152 through the stud assembly stud bore 68 to the plunger 154 in the stud bore 68. As represented in FIG. 12, the plunger 154 is much shorter than the plunger 76 of the first described embodiment to accommodate the lengths of the pistons 176, 178. The plunger 154 includes a thrust bearing 180 positioned between the plunger 154 and the pistons 176, 178. The thrust bearing 180 avoids the introduction of torque to the pistons 176, 178 from the relative rotation of the mount assembly 12 and stud assembly 14.

The apparatus 150 of FIGS. 12 and 13 is operating according to the same method of the first described embodiment to dispense the adhesive components 156, 158 through the respective conduits 170, 172, through the mixer 168 and into the adhesive well 28 of the mount assembly 12.

Figure 14:
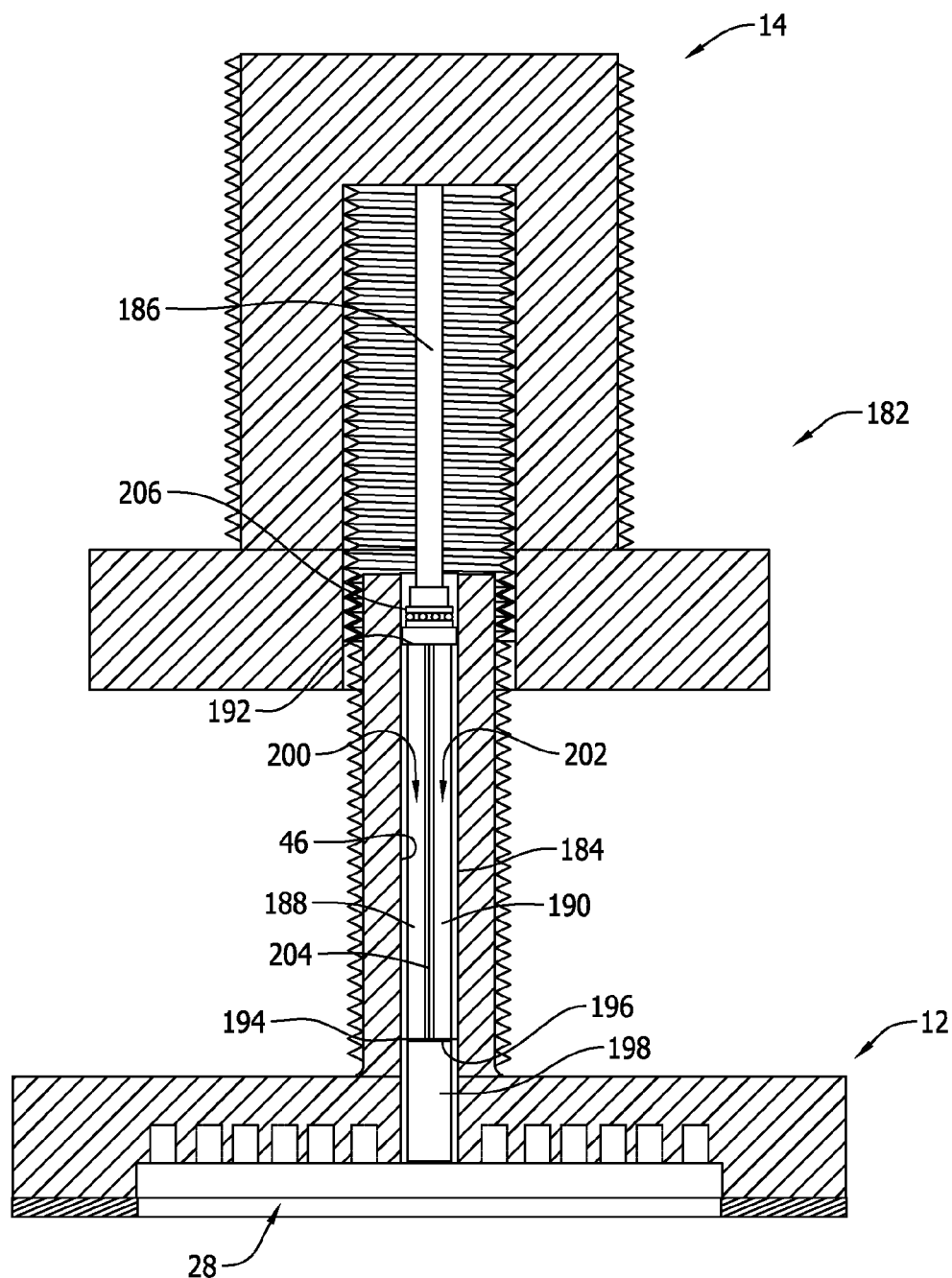
FIG. 14 is a representation of a side sectioned view of a further embodiment of the apparatus.

FIG. 14 is a representation of a still further embodiment of the apparatus 182. In the apparatus 182 of FIG. 14, the adhesive cartridge 184 has a different construction from that of the first described adhesive cartridge 16, but is similar to that of the last described cartridge 152. Additionally, the stud assembly plunger 186 has a modified construction to accommodate the adhesive cartridge 184. The remaining features of the apparatus 182 are the same as those of the first described apparatus 10 and are labeled with the same reference numbers.

As in previously described embodiments, the adhesive cartridge 184 is designed to hold an adhesive that mixes first 188 and second 190 components, for example an epoxy with first and second epoxy components. The cartridge 184 is cylindrical and has a length with opposite first 192 and second 194 ends. A burst seal 196 is provided at the cartridge second end 194. The burst seal 196 separates the interior of the cartridge 184 from an adhesive mixer 198. The cartridge 184 includes first 200 and second 202 compartments that extend, side by side, along the cartridge length. An internal wall 204 extends across the cylindrical interior of the cartridge 184 and along the length of the cartridge separating the first 188 and second 190 adhesive components. The internal wall 204 gives the first 200 and second 202 compartments half circle cross-section configurations. The first 200 and second 202 compartments contain the respective first 188 and second 190 components of the adhesive. The adhesive cartridge 184 and the cartridge internal wall 204 are constructed of flexible material forming the cartridge 184 as a flexible divided packet. As represented in FIG. 14, the stud assembly plunger 186 includes a thrust bearing 206 positioned between the plunger and the adhesive cartridge 184. As in previously described embodiments, the thrust bearing 206 avoids the introduction of torque to the adhesive cartridge 184 from relative rotation of the mount assembly 12 and stud assembly 14.

The apparatus 182 of FIG. 14 is operated according to the same method of the first described embodiment to dispense the adhesive components 188, 190 from the collapsible compartments 200, 202 of the adhesive cartridge 184, through the burst seal 196 and the mixer 198 and into the adhesive well 28 of the mount assembly 12 as the plunger 186 collapses the adhesive cartridge 184 in the mount assembly shaft bore 44.

Figure 15:
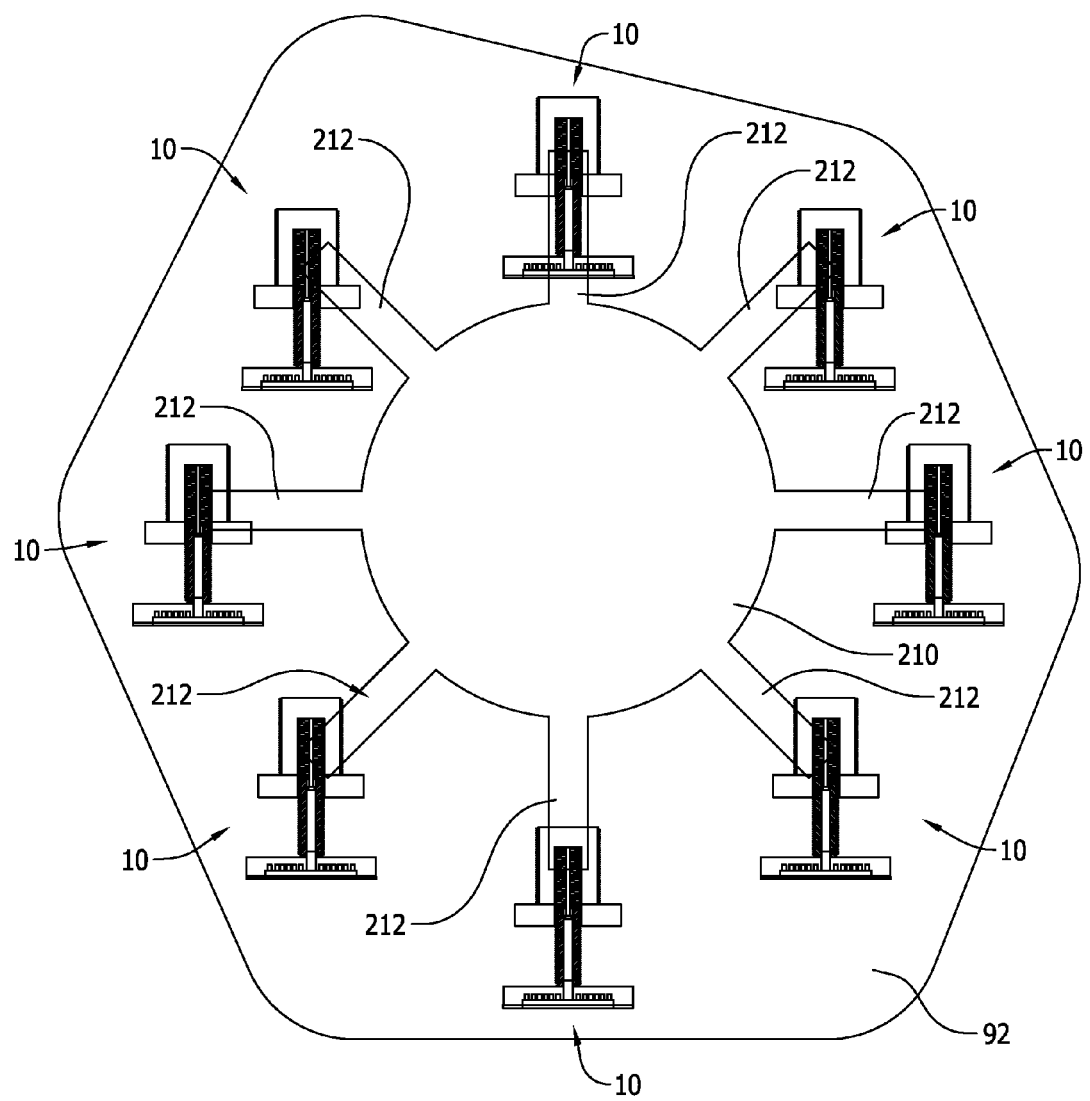
FIG. 15 is a representation of a template removably attached to a plurality of the self-contained stud adhesive bonding apparatus.

FIG. 15 is a representation of a template 210 that may be used with any of the described apparatus, but is described in use with the first apparatus 10. The template 210 has a plurality of attachment areas 212. Each of the attachment areas 212 can be removably attached to one of the self-contained stud adhesive bonding apparatus 10. Thus, the template 210 can be removably attached to a plurality of the self-contained stud adhesive bonding apparatus 10 and hold the plurality of self-contained stud adhesive bonding apparatus 10 at fixed relative positions. With the plurality of apparatus 10 removably attached to the attachment areas 212 of the template 210, the template can then be positioned relative to a separate surface 92 and position each of the plurality of apparatus 10 at a desired position on the separate surface 92. The mount assemblies 12 of each of the apparatus 10 can then be adhered to the separate surface 92, thereby mounting the studs 60 of the plurality of apparatus 10 to the separate surface 92 at desired relative positions of the studs 60. The studs 60 are exactly positioned by the template 210 on the separate surface 92, reducing the potential for misalignment when a final fixture such as a doubler or pressure wall repair is installed to the separate surface 92.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A self-contained stud adhesive bonding apparatus comprising:
 a mount assembly having a base, an adhesive well recessed into the base, a shaft projecting from the base, the shaft having a shaft bore that extends through the shaft and through the base to the adhesive well;
 an adhesive inside the shaft bore; and,
 a stud assembly that is removably attached to the mount assembly, the stud assembly having an externally screw threaded stud, a stud bore extending through the stud to a stud bore end surface, the stud assembly stud bore being fit over the mount assembly shaft and thereby removably attaching the stud assembly to the mount assembly for movement of the stud over the shaft, and a plunger extending from the stud bore end surface through the stud bore, the plunger being positioned in the stud bore to move through the shaft bore and push the adhesive in the shaft bore out of the shaft bore and into the adhesive well in response to the stud being moved over the shaft toward the base.

2. The apparatus of claim 1, further comprising:
 a seal on the base, the seal extending completely around the adhesive well.

3. The apparatus of claim 1, further comprising:
 a thrust bearing on the plunger.

4. The apparatus structure of claim 1, further comprising:
 the mount assembly shaft having an exterior surface configuration and the stud assembly stud bore having an interior surface configuration that interact and cause the stud assembly to move over the mount assembly and cause the stud assembly stud to move toward the mount assembly base in response to relative rotation between the mount assembly and the stud assembly.

5. The apparatus of claim 1, wherein the self-contained stud adhesive bonding apparatus is one of a plurality of self-contained stud adhesive bonding apparatuses, and further comprising:
 a template that is removable attachable to the plurality of self-contained stud adhesive bonding apparatuses, the template holding the plurality of self-contained apparatuses removably attached to the template at fixed relative positions.

6. The apparatus of claim 1, further comprising:
 the mount assembly shaft having external screw threading and the stud assembly stud bore having internal screw threading that interact and cause the stud assembly to move over the mount assembly and cause the stud assembly stud to move toward the mount assembly base in response to relative rotation between the mount assembly and the stud assembly.

7. The apparatus of claim 1, further comprising:
 the stud assembly having a bolt head, the stud bore extending through the bolt head, the bolt head extending outwardly from the stud and extending around the stud.

8. The apparatus of claim 1, further comprising:
 the adhesive being an epoxy with first and second epoxy components;
 the shaft bore having a general figure eight cross-section configuration;
 a cartridge inside the shaft bore, the cartridge having a length with opposite first and second ends, the cartridge having first and second cylindrical conduits that extend, side by side, through the cartridge length, the first and second conduits giving the cartridge a general figure eight cross-section configuration that fits in the general figure eight cross-section configuration of the shaft bore, the first and second conduits containing the respective first and second epoxy components, a mixer at the first end of the cartridge and a pair of pistons at the second end of the cartridge; and,
 the stud assembly plunger engaging against the pair of pistons.

9. The apparatus of claim 1, further comprising:
 the adhesive being an epoxy with first and second epoxy components;
 the shaft bore having a circular cross-section configuration;
 a cartridge inside the shaft bore, the cartridge having a length with opposite first and second ends, the cartridge having a circular cross-section configuration that fits in the shaft bore, the cartridge having an interior wall that extends across the cartridge and through the cartridge length dividing the cartridge into first and second conduits with half circle cross-section configurations, the first and second conduits containing the respective first and second epoxy components, a mixer at the cartridge first end and a pair of pistons at the cartridge second end, the pair of pistons each having a half circle cross-section configuration; and,
 the stud assembly plunger engaging against the pair of pistons.

10. That apparatus of claim 1, further comprising:
 the adhesive being an epoxy with first and second epoxy components;
 the shaft bore having a circular cross-section configuration;
 a compressable cartridge in the shaft bore, the compressable cartridge having a length with opposite first and second ends, the cartridge having first and second interior compartments that extend through the cartridge length, the first and second interior compartments containing the respective first and second epoxy components, a mixer at the cartridge first end and an epoxy plunger at the cartridge second end; and,
 the stud assembly plunger engaging against the epoxy plunger.

11. A self-contained stud adhesive bonding apparatus comprising:
 a mount assembly;
 a stud assembly removably attached to the mount assembly;
 an adhesive cartridge;
 the mount assembly having a base, the base having a first base surface and a second base surface on an opposite side of the base from the first base surface, the base also having an adhesive well recessed into the first base surface, the mount assembly further having a shaft projecting from the second base surface;

the mount assembly still further having a shaft bore extending from a bore opening of the shaft bore in the adhesive well through the base and through the shaft to a shaft end opening of the shaft bore;

the stud assembly having a bolt head, the bolt head having a first bolt head surface, a second bolt head surface on an opposite side of the bolt head from the first bolt head surface, and a bolt head side surface that extends between the first bolt head surface and the second bolt head surface;

the stud assembly also having a stud projecting from the second bolt head surface, the stud having an external screw threading;

the stud assembly further having a stud bore extending from a bolt head opening of the stud bore in the first bolt head surface, through the bolt head and into the stud to a stud bore end surface in the stud bore;

the stud assembly still further having a plunger in the stud bore, the plunger extending through the stud bore from the stud bore end surface to a distal end surface of the plunger; and, the adhesive cartridge in the shaft bore, the adhesive cartridge having an interior containing adhesive and a mixer, the mixer being positioned in the shaft bore adjacent the adhesive well.

12. The apparatus of claim 11, further comprising:
a seal on the first base surface, the seal extending completely around the adhesive well.

13. The apparatus of claim 11, further comprising:
a thrust bearing on the distal end surface of the plunger.

14. The apparatus of claim 11, further comprising:
the mount assembly shaft having an exterior surface configuration and the stud assembly stud bore having an interior surface configuration that interact and cause the stud bore interior surface to move over the shaft exterior surface and cause the stud assembly bolt head to move toward the mount assembly base in response to relative rotation between the mount assembly and the stud assembly.

15. The apparatus of claim 11, wherein the self-contained stud adhesive bonding apparatus is one of a plurality of self-contained stud adhesive bonding apparatuses, and further comprising:
a template that is removable attachable to the plurality of self-contained stud adhesive bonding apparatuses, the template holding the plurality of self-contained apparatuses removably attached to the template at fixed relative positions.

16. The apparatus of claim 11, further comprising:
the mount assembly shaft having external screw threading and the stud assembly stud bore having internal screw threading that interact and cause the stud internal screw threading to move over the shaft external screw threading and cause the stud assembly bolt head to move toward the shaft assembly base in response to relative rotation between the mount assembly and the stud assembly.

17. A method of adhesive bonding a stud to a separate surface, the method comprising:
positioning a mount assembly having a base with opposite first and second base surfaces, an adhesive well recessed into the first base surface, a shaft projecting from the second base surface and a shaft bore extending through the shaft and the base to the adhesive well against the separate surface with the first base surface and the adhesive well opposing the separate surface;

positioning an adhesive inside the shaft bore;

attaching a stud assembly to the mount assembly shaft, the stud assembly having a bolt head with opposite first and second bolt head surfaces, an externally screw threaded stud projecting from the second head surface to an end surface of the stud, a stud bore extending through the first bolt head surface, through the bolt head and into the stud to a stud bore end surface inside the stud, and a plunger extending from the stud bore end surface through the stud bore, the plunger moving through the shaft bore and pushing the adhesive from the shaft bore and into the adhesive well in response to positioning the stud assembly stud bore over the mount assembly shaft and moving the stud assembly over the mount assembly while attaching the stud assembly to the mount assembly, the adhesive pushed into the adhesive well securing the mount assembly and the attached stud assembly to the separate surface.

18. The method of claim 17, further comprising:
sealing the first base surface to the separate surface with a seal applied to the first base surface around the adhesive well and compressing the seal between the first base surface and the separate surface.

19. The method of claim 17, further comprising:
causing the stud assembly to move over the mount assembly and causing the stud assembly bolt head to move toward the mount assembly base in response to relative rotation between the mount assembly and the stud assembly.

20. The method of claim 17, further comprising:
attaching a plurality of mount assemblies, a plurality of adhesives positioned in the plurality of mount assembly shaft bores, and a plurality of stud assemblies attached to the plurality of mount assemblies to a template at fixed relative positions of the plurality of mount assemblies; and, using the template to secure the plurality of mount assemblies to the separate surface at the fixed relative positions of the plurality of mount assemblies.

\* \* \* \* \*